Oct. 20, 1931.  C. W. EBELING  1,828,399
PHOTOELECTRIC CELL LIGHT RAY CONDENSER
Filed Sept. 18, 1930
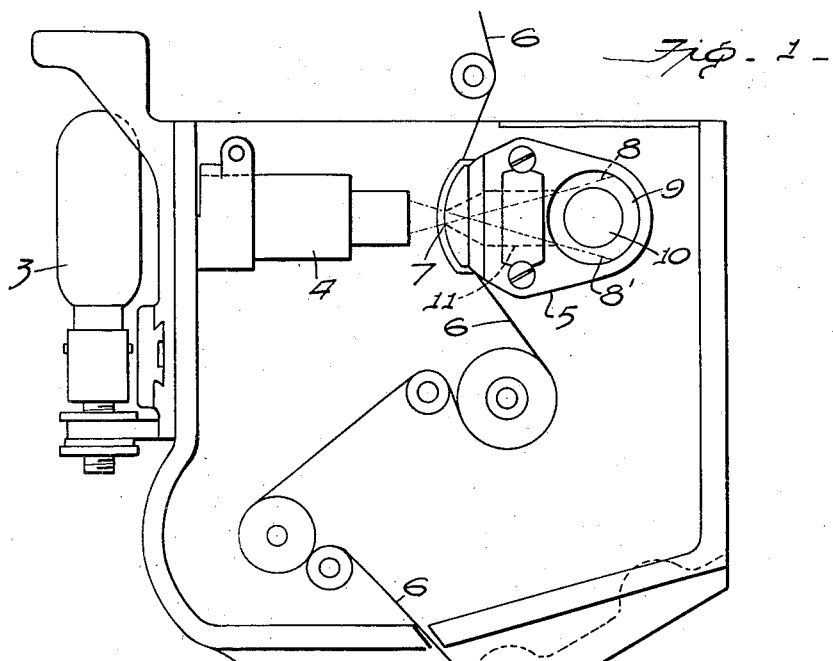
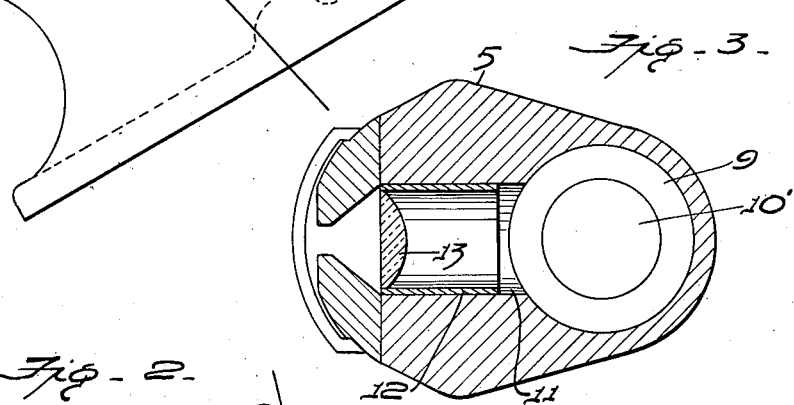
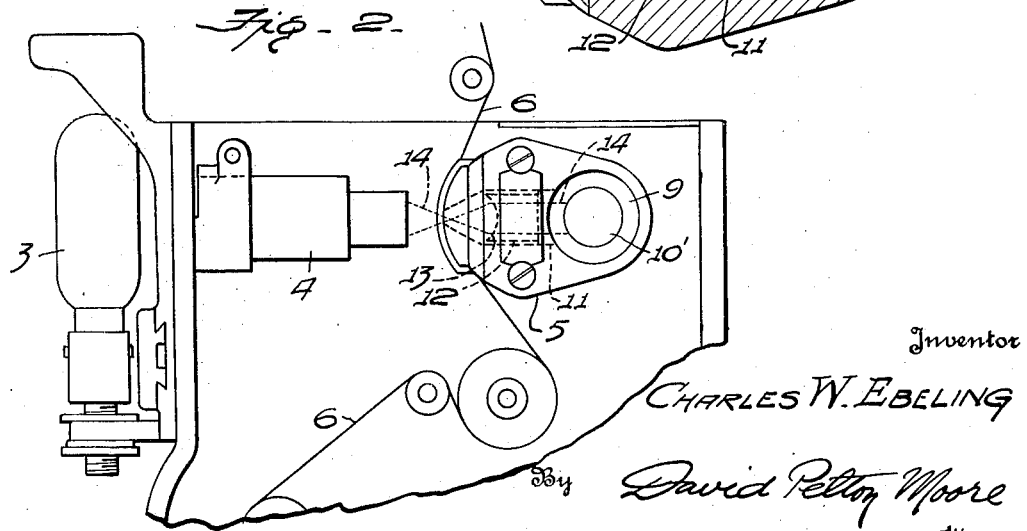
Inventor
CHARLES W. EBELING
By David Pelton Moore
Attorney Patented Oct. 20, 1931

1,828,399

UNITED STATES PATENT OFFICE

CHARLES W. EBELING, OF NEW YORK, N. Y., ASSIGNOR TO GENERAL TALKING PICTURES CORPORATION, OF NEW YORK, N. Y., A CORPORATION OF DELAWARE

PHOTOELECTRIC CELL LIGHT RAY CONDENSER

Application filed September 18, 1930. Serial No. 482,828.

The present invention relates to a photoelectric cell light ray condenser, one object of which is to condense the rays of light after the same has passed through the sound track of the film and before the same impinges the photoelectric cell thus insuring higher efficiency in the action from the cell due to the concentration of the beam of light thereon.

It has been found in practise in the reproducing of sound wherein a film provided with a sound track is acted upon by a beam of light generated by an exciter lamp and directed through an optical system upon the film, that in many cases the rays from said beam of light after passing through the film to an aperture behind which is disposed the photoelectric cell has a tendency to disperse or in other words there is a wide angle of dispersion of the light rays behind the film and therefore the most efficient results can be obtained by condensing the rays that are finally received by the photoelectric cell. In fact, experiments conducted have shown a gain of light intensity of approximately 40% when a condensing lens has been interposed between the film and the photoelectric cell, or in fact any reflecting and condensing lens that will tend to bring the dispersed rays into a compact bundle as it were, so that concentrated rays are brought into contact with the photoelectric cell.

In order that the present invention may be clearly understood, attention is invited to the accompanying drawings in which:

Figure 1 is a diagrammatic view of an optical arrangement now employed in sound reproducing apparatus, and particularly of a type used with talking pictures.

Figure 2 is a similar view with the present invention in use.

Figure 3 is a detailed cross sectional view through a slit block unit showing the present lens carrying member mounted therein.

Referring to drawings and more particularly to Figure 1 thereof, the numeral 3 designates an exciter lamp, 4 an optical system, and 5 a slit block unit, a film 6 provided with the usual sound track not shown either of the variable density or variable area type being adapted to be moved over the curved surface of the block 5 so that the concentrated light beam from the exciter lamp will impinge the same at 7 and will follow the dotted lines 8 and 8' through the cylindrical bore 11 to emerge within the annular chamber 9 to affect the photoelectric cell 10, all of usual construction. It will thus be seen that after the beam passes the film that there is a wide angle of dispersion between the lines 8 and 8', and that therefore a considerable volume of the beam has no effect upon the photoelectric cell 10.

In order to prevent this wide angle of dispersion of the light rays as shown in Figure 2 a tube 12 is removably mounted within the bore 11 and carries condensing lens 13 which thus receives the light rays 14 and causes the same to be directed as illustrated by the dotted lines so as to impinge upon the photoelectric cell 10' to produce a gain in light intensity.

In practise it has been found as above set forth that with the lens 13 properly placed a unit gain of 25 db, which represents a gain in light intensity of approximately 40%.

What is claimed is:

The combination with a slit block unit having a film guiding surface with an aperture there through, a cylindrical bore leading from said aperture toward the rear of the block and a larger bore transversely thereto through the block, the latter constituting a photoelectric cell receptacle, of means for collecting rays of light projected through the aperture of the slit block, mounted in the first bore and including a removable tube, and a condensing lens carried by said tube.

In testimony whereof I affix my signature.

CHARLES W. EBELING.